US008972374B2

(12) United States Patent
Benson et al.

(10) Patent No.: US 8,972,374 B2
(45) Date of Patent: Mar. 3, 2015

(54) CONTENT ACQUISITION SYSTEM AND METHOD OF IMPLEMENTATION

(75) Inventors: Jesse L. Benson, Acworth, GA (US); Stephen E. Jaffe, Canton, GA (US); John R. Smith, New Hyde Park, NY (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1848 days.

(21) Appl. No.: 12/029,678

(22) Filed: Feb. 12, 2008

(65) Prior Publication Data
US 2009/0204617 A1 Aug. 13, 2009

(51) Int. Cl.
G06F 17/30 (2006.01)

(52) U.S. Cl.
CPC .... *G06F 17/30817* (2013.01); *G06F 17/30029* (2013.01)
USPC .......................................... 707/709; 707/770

(58) Field of Classification Search
CPC ................. G06F 17/30817; G06F 17/30029
USPC ................... 455/466; 707/200, 776, 709, 770
See application file for complete search history.

(56) References Cited

U.S. PATENT DOCUMENTS

| | | | |
|---|---|---|---|
| 6,983,379 B1 * | 1/2006 | Spalink et al. ................... 705/50 |
| 7,124,299 B2 * | 10/2006 | Dick et al. ..................... 713/178 |
| 7,209,571 B2 | 4/2007 | Davis et al. |
| 2002/0128925 A1 * | 9/2002 | Angeles ........................... 705/26 |
| 2002/0143933 A1 * | 10/2002 | Hind et al. ..................... 709/224 |
| 2002/0194480 A1 | 12/2002 | Nagao |
| 2003/0028889 A1 | 2/2003 | McCoskey et al. |
| 2004/0114603 A1 * | 6/2004 | Suhail et al. ................... 709/228 |
| 2004/0220926 A1 | 11/2004 | Lamkin et al. |
| 2006/0179080 A1 * | 8/2006 | Meek et al. .................... 707/200 |
| 2006/0294244 A1 * | 12/2006 | Naqvi et al. ................... 709/227 |
| 2008/0132257 A1 * | 6/2008 | Fok et al. ....................... 455/466 |
| 2008/0134018 A1 * | 6/2008 | Kembel et al. ................. 715/234 |
| 2008/0163202 A1 * | 7/2008 | Kembel et al. ................. 717/178 |
| 2009/0055893 A1 * | 2/2009 | Manessis et al. .................. 726/2 |
| 2009/0204516 A1 * | 8/2009 | Berry et al. ...................... 705/30 |
| 2009/0228481 A1 * | 9/2009 | Neale et al. ....................... 707/5 |
| 2009/0265463 A1 * | 10/2009 | Greifeneder et al. .......... 709/224 |
| 2009/0265466 A1 * | 10/2009 | Yoshikawa .................... 709/226 |
| 2009/0276372 A1 * | 11/2009 | Wallman ...................... 705/36 R |
| 2010/0057845 A1 * | 3/2010 | Thomas et al. ................ 709/203 |
| 2010/0081116 A1 * | 4/2010 | Barasch et al. ................ 434/252 |
| 2012/0036248 A1 * | 2/2012 | Naqvi et al. ................... 709/223 |

OTHER PUBLICATIONS

Mark Fullmer and Steve Romig, "The OSU Flow-tools Package and Cisco NetFlow Logs", 2000 LISA XIV—Dec. 3-8, 2000—New Orleans, LA, pp. 291-304.*

* cited by examiner

*Primary Examiner* — Shahid Alam
(74) *Attorney, Agent, or Firm* — Matthew Chung; Roberts Mlotkowski Safran & Cole, P.C.

(57) ABSTRACT

A system is provided which solves content acquisition issues by providing an automated method to acquire content in mass and maintain an association between available meta-data and the actual content, e.g., video file. The system includes a first component configured to log network traffic. The system also includes a second component configured to correlate downloaded content of the logged network traffic with an XML stream of URLs and respective content descriptions.

25 Claims, 3 Drawing Sheets

CONTENT ACQUISITION SYSTEM AND METHOD OF IMPLEMENTATION

FIELD OF THE INVENTION

The invention generally relates to a system and method for computer systems and, more particularly, the invention relates to a system and method for acquiring electronic content.

BACKGROUND OF THE INVENTION

As more and more content is made available in the form of video, content aggregators are looking for ways to entice visitors to their sites. They want to be "the place" to go for information about categories that they choose to serve. This information is being generated in the form of videos that are either professionally developed or are user generated. As such, the video information is coming from a growing number of sources and creates problems for the content aggregator in terms of the number of sources of content and the volume of content that is being received.

The acquisition of the content is both labor intensive and time consuming. For example, methods exist to help in the automated classification of the content. However, a prerequisite for this and other video analysis (speech to text, object tracking, facial recognition, video piracy detection, etc.) is that the content must be made available to the various analysis tools. This means that the content must be acquired for input to the tools, from numerous sources, and in large volumes.

Known solutions to this problem include web sites that allow the user to enter the URL of a page that includes video. But, these sites have drawbacks in that they are manual processes and are very time consuming and labor intensive and do not, for example, provide many other features such as cataloging of the content. For example, in one known process, a user would search many different web sites and sources for relevant content. Once content is found, the user would record, e.g., write down, the URL and provide such information to another user for review. The other user then has to download the content and determine its relevancy. The other user would also have to determine whether the content even still exists. If the content exists and is relevant, the user then has to provide a description of the content. The URL and description can then be saved. However, as noted above, such processes are time consuming and, additionally, are prone to error. For example, the wrong URL can be matched to an incorrect or inaccurate description of the content. In this way, it may not be even possible to locate the content of interest, or may be difficult to discern which content is relevant.

Accordingly, there exists a need in the art to overcome the deficiencies and limitations described hereinabove.

SUMMARY OF THE INVENTION

In a first aspect of the invention a system comprises a first component configured to log network traffic. The system also comprises a second component configured to correlate downloaded content of the logged network traffic with an XML stream of URLs and respective content descriptions.

In another aspect of the invention, a system is provided for correlating URLs and a description of content associated with the URLs. The system comprises a computer infrastructure operable to at least parse an XML stream for URLs, log network traffic of downloaded content of the parsed URLs and correlate a description of the downloaded content, the URL of the downloaded content and the URL of the XML stream.

In another aspect of the invention, a method is provided for correlating content and a description of content associated with a URL. The method comprises providing a computer infrastructure operable to detect and download media files, log content which is downloaded for each page load and associate a description of the downloaded media files with a URL provided in an XML stream.

In another aspect of the invention, a computer program product comprises a computer readable media; first program instructions to parse an XML stream for URLs; second program instructions to log network traffic associated with the downloaded content associated with the parsed URLs; and third program instructions to correlate the downloaded content with a description of the downloaded content. The first, second and third program instructions are stored on the computer readable media.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to a system and method for acquiring content. More specifically, the system and method of the invention solves content acquisition issues by providing an automated method to acquire content in mass and maintain an association between available meta-data and the actual content, e.g., video file.

In one exemplary implementation, the system and method of the invention provides an automated process that can take, as input, a large quantity of web pages (e.g., content which may include video content), and for each page determine the media file so that it can be downloaded. The system and method uses commonly available text based information, e.g., meta-data about the content, and correlates this information to the acquired file. Advantageously, the invention is capable of maintaining an association between the available meta-data and the actual content, e.g., video file, that was downloaded for review so that a record can be maintained of the description of the content, the URL and the storage location. In this way, a user can readily catalogue the content of the URL and its description for future use.

System Environment

Figure 1:
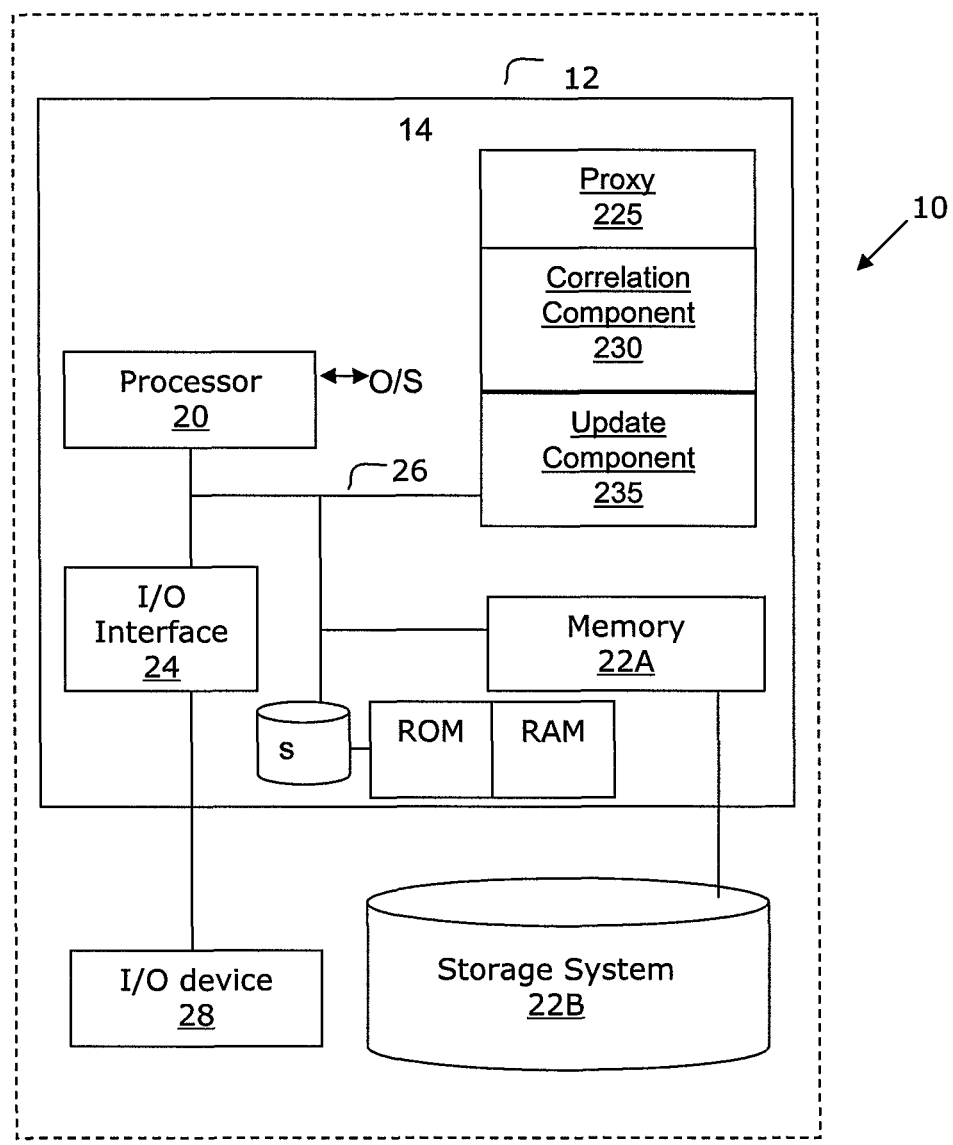
FIG. 1 shows an illustrative environment for implementing aspects of the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises at least a proxy 225 and a correlation component 230. In further embodiments, the computing device 14 can also include an update component 235.

In embodiments, the proxy 225 is responsible for detecting and downloading media files, as well as logging the content which is downloaded for each page load. The logging of the content allows the meta-data and the content, e.g., video files, to be correlated with each other via the correlation component 230. Once the meta-data and the content are correlated, they can be stored in storage system 22B, for example. The correlated information, in embodiments, is provided in an XML file thereby allowing for documentation and analysis of the acquired media files.

In this manner, the system of the present invention is configured to provide an automated process to acquire content in large quantity by maintaining an association between available text-based information and actual downloaded files. Thus, under the present invention, web pages can be scanned and media files automatically downloaded with corresponding text-based information. The media files can then be automatically categorized based on the corresponding text-based information. In one aspect of the present invention, an XML file containing meta-data for the text-based information is utilized to build a script for the automatic scan of listed URLs. In another aspect of the present invention, a downloading and logging process is capable of handling content (e.g., video and other content) that requires a non-standard method to acquire. In yet another aspect of the present invention, once the content is downloaded and correlated, a new XML file is generated allowing for documentation and analysis of the acquired media files.

The computing device 14 further includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. The program code can be used to implement the processes associated with the components of the present invention, e.g., proxy, correlation component, update component and script builder (See, e.g., FIG. 2).

Further, the computing device 14 is in communication with the external I/O device/resource 28 and a storage system 22B. In the present implementation, the I/O device 28 can be a graphical user interface, which provides the user with a mechanism to view downloaded and/or saved URLs. The I/O device 28 can also be used to access the documentation and analysis of the media.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to the computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a service provider, such as a Solution Integrator, could offer to perform the processes described herein. In this case, the service provider can create, maintain, deploy, support, etc., a computer infrastructure (e.g., computing infrastructure of FIG. 1) that performs the process steps of the invention for one or more customers. In return, the service provider can receive payment from the customer(s) under a subscription and/or fee agreement.

Exemplary System of the Invention

Figure 2:
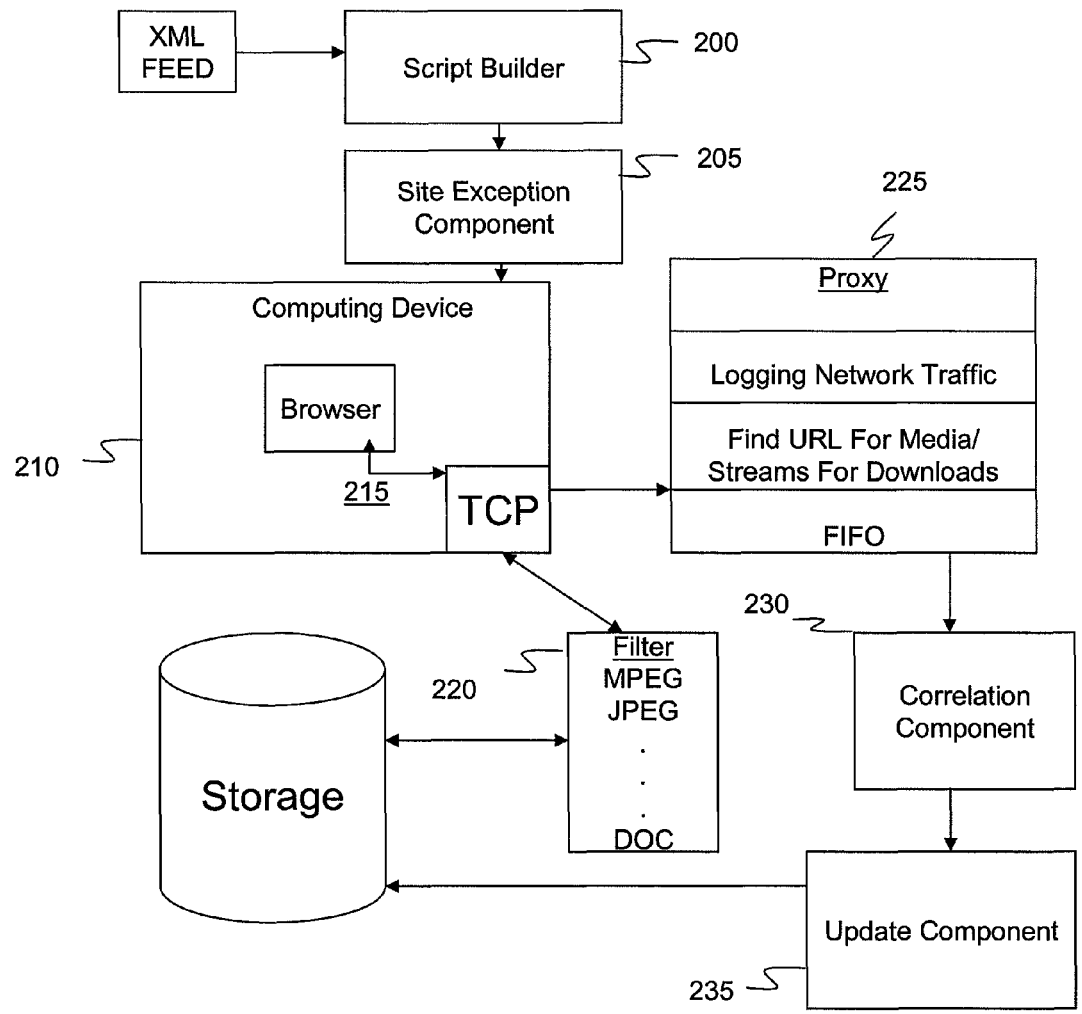
FIG. 2 shows an end to end system view of an embodiment in accordance with the present invention.

FIG. 2 shows an implementation of an end to end view of the system in accordance with the invention. FIG. 2 also illustratively represents a high-level flow diagram, implementing processes in accordance with the invention using, for example, the infrastructure shown in FIG. 1.

In FIG. 2, an XML feed is provided to a script builder 200. The XML feed typically includes a series of URLs of web pages of interest. The XML feed can also include a description of the content, in embodiments, associated with the URLS. For example, the XML file can include the text based meta-data available for the content which may include, e.g., title, description, category, video rank, channel, format, etc. The script builder 200 is configured to parse the XML feed for the URL for each feed. The URL is then fed to a site exception component 205. The site exception component 205 makes a determination as to whether the URL is still in existence. The site exception component 205 is also configured to handle content that requires a non-standard method to acquire the content e.g., based on the channel or source of the content.

If the URL still exists (and, in embodiments, can be downloaded in a standard method to acquire the content), the URL is then provided to the computing device 210. The computing device 210 includes a browser and TCP (generally depicted as reference numeral 215) which is configured to download the URL. In embodiments, the browser can be a part of the I/O device 28 of FIG. 1 and is configured to upload and view the content associated with the parsed URL. As should be understood by those of skill in the art, the exception content (content that has to be acquired in a non-standard method) can also be provided to the computing device 210 for alternate methods of obtaining the content, as should be understood by those of skill in the art.

Prior to loading the page (URL), a configurable filter 220 can be used to filter certain URLs. For example, the filter 220 can be set to filter out all JPEG documents. Similarly, the filter 220 can be configured to allow the download of only video streams or other types of content. In further embodiments, the system and method of the invention contemplates loading the content and waiting for advertisements to play and then staying on the downloaded page for a specified amount of time such that the content fully plays. This process continues for each page provided in the input file for the TCP/browser 215, where each page can be visually seen in the browser window. This provides visual feedback that the acquisition process is working.

The content of the downloaded URL can be asynchronously stored in storage. In embodiments, as should be recognized by those of skill in the art, the storage can be the storage system 22B of FIG. 1. The URL is also provided to the proxy 225.

The proxy 225 logs the network traffic and creates a record of the URLs. This log can also include the exception content (e.g., content which is uploaded via a non-conventional method), as well as those URLs which no longer exist. That is, the proxy 225 is responsible for detecting and downloading the media files, as well as logging the content (e.g., description of the content) which is downloaded for each page load. The proxy 225 can also record the location of the downloaded URL in the storage. The logging, in embodiments, can include seeking and providing a description of the downloaded content, via its meta-data such that a description of the content is stored with the content.

The log of URLs is then provided to a correlation component 230. The correlation component 230 makes a comparison between the downloaded URL and the URLs of the original XML feed. In embodiments, the original XML feed is synchronized with the log of the URLs so that a match can be made between the logged URLs and the URLs of the original XML feed. In this way, it is possible to match the downloaded content with a description of the content and the URLs of the XML feed. For example, in one embodiment, as the XML feed includes the meta-data of the content, such meta-data can now be correlated with the actual downloaded content. In another example, the description of the downloaded content recorded in the log can be matched to the URL in the XML feed.

In any scenario, the matches are then provided to the update component 235, which adds a tag (record) of a file name. The tag can include the storage location of the downloaded content and/or a description of the content or pointer thereto. The description can be the meta-data of the content as originally provided in the XML stream or provided by the proxy when the content was downloaded and/or saved. The tag can be provided as a new XML feed, which is stored in the storage.

Exemplary Processes in Accordance with the Invention

Figure 3:
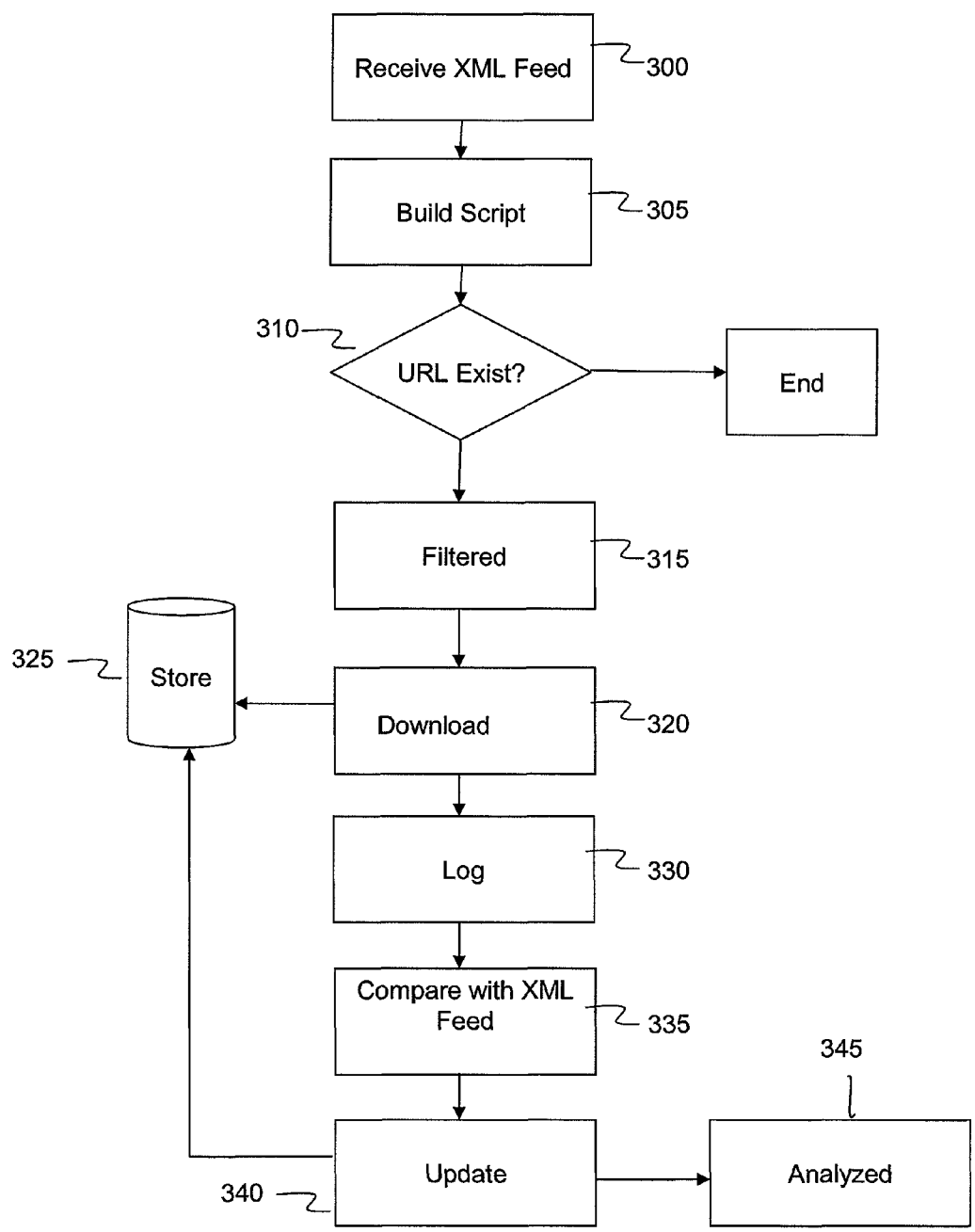
FIG. 3 shows a flow diagram implementing processes in accordance with the invention.

FIG. 3 is a flow diagram implementing processes in accordance with the invention. FIG. 3 can also represent a high level block diagram of the system of the invention. The processes described herein may be implemented on computer program code in combination with the appropriate hardware as described with reference to FIG. 1. This computer program code may be stored on storage in a storage system such as shown at reference numeral 22B. In embodiments, the storage system can be a storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

The invention can take the form of an entirely hardware embodiment or an embodiment containing both hardware and software elements (any of which is referred generally as "file management program"). The hardware and software elements include a computer infrastructure configured to implement the functionality of the present invention. The computer infrastructure may take the form, for example, of the environment of FIG. 1. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Referring to FIG. 3, at step 300, the program code receives an XML feed. The XML feed can include a series of URLs and related descriptions (meta-data of the URL). At step 305, the XML feed is parsed to determine each URL. At step 310, a determination is made as to whether the URL still exists. If the URL does not exist, the process ends. If the URL exists, at step 315, an optional filtering process can be performed in which certain content can be filtered out. In this way, only certain URLs of interest will be downloaded. At step 320, the filtered content is downloaded. The downloading can also include exception content, as discussed above. At step 325, the downloaded content is saved in storage.

At step 330, the downloaded URL with a description of the content can be logged and, at step 335, compared to the original XML stream. Alternatively, only the URL content is logged. Once matches are found, an updated XML can be generated and stored in the storage at step 325. The updated XML will include a tag identifying the URL, a description of the content of the URL, and the storage location of the content.

In further embodiments, the saved content can then be analyzed at step 345. For example, having the information correlated allows for multi-modal processing of the content, where both the traditional meta-data and meta-data extracted using video analysis techniques can be utilized. The various video analysis techniques can be, for example, analysis for visual classification, object detection, facial detection, speech to text conversion, as well as other analysis such as, for example, piracy and duplicate detection. If required, analysis can be applied to remove duplicate content.

In this way, it is possible to advantageously maintain an association between the available meta-data and the actual content, e.g., video file, that was downloaded for review so that a record can be maintained of the description of the content, the URL and the storage location. Accordingly, by implementing the processes and system of the invention a user can readily catalogue the content of the URL and its description for future use.

Also, various video analysis techniques can be applied, since the content is now acquired in an automated fashion, from various sources, in large volumes, and with the meta-data tied back to the acquired content. Having both the meta-data and the content available allows the content aggregator to use the content directly on their site, rather than linking to another site to view the videos. It also positions the content aggregator to take advantage of the various video analysis techniques, potentially using the meta-data that these tools produce as input to Search Engines.

While the invention has been described in terms of embodiments, those skilled in the art will recognize that the invention can be practiced with modifications and in the spirit and scope of the appended claims.

What is claimed is:

1. A system comprising:
   a hardware memory device that stores program instructions; and
   a processor that executes the program instructions and causes:
   a first component to log network traffic by creating a record of downloaded URLs; and
   a second component to correlate the downloaded URLs of the logged network traffic with an XML stream of URLs to match downloaded content of the logged network traffic with respective content descriptions and the URLs of the XML stream.

2. The system of claim 1, further comprising an update component which is configured to tag a URL of the downloaded content with storage location information.

3. The system of claim 2, further comprising storage configured to receive the tag from the update component and store the tag with the downloaded content.

4. The system of claim 2, wherein the update component is configured to provide the tag in XML format with at least one of the URL and description of the downloaded content.

5. The system of claim 2, wherein the update component includes a description of the downloaded content or a pointer to the description in the tag.

6. The system of claim 1, wherein the first component is a proxy which is configured to provide a description of the downloaded content.

7. The system of claim 1, further comprising a filter which is configured to filter certain content types prior to downloading of the content.

8. The system of claim 1, further comprising a script builder configured to parse the XML stream for URLs and provide the URLs to a browser for display.

9. The system of claim 1, further comprising an exception component which is configured to determine at least one of: whether a URL associated with the XML stream exists, and whether content of the URL is accessible via conventional download methods.

10. The system of claim 1, wherein the second component is configured to associate available meta-data of the downloaded content and a URL of the downloaded content.

11. The system of claim 10, further comprising a third component configured to generate a record which includes a description of the downloaded content, the URL of the downloaded content and a storage location of the downloaded content.

12. The system of claim 1, wherein the first and second component are maintained on a computer infrastructure by a service provider for a fee.

13. A computing system for correlating a description of content and content, the system comprising:
   a CPU, a computer readable memory and a hardware memory device;
   first program instructions to at least parse an XML stream for URLs;
   second program instructions to log network traffic of downloaded content of the parsed URLs; and
   third program instructions to correlate at least the description of the downloaded content and the URL of the XML stream,
   wherein the first, second and third program instructions are stored on the hardware memory device for execution by the CPU via the computer readable memory.

14. The computing system of claim 13, wherein the computing system is at least one of maintained, deployed, supported and created by a service provider for a fee.

15. The computing system of claim 13, wherein the computing system is operable to detect a URL of the downloaded content and compare the URL of the downloaded content with a URL of the XML stream.

16. The computing system of claim 13, wherein the computing system is operable to store the downloaded content and description and provide a location of the stored downloaded content and description.

17. The computing system of claim 13, wherein the computing system is operable to tag a URL of the downloaded content with a file name.

18. The computing system of claim 17, wherein the tag includes storage location of the downloaded content and/or a description of the content or pointer thereto.

19. A method for correlating URLs and a description of content associated with the URLs that is implemented in a computer infrastructure having computer executable code tangibly embodied on a hardware memory device having programming instructions operable to:
   detect and download media files, log content which is downloaded for each page load, and associate the downloaded media files with a URL provided in an XML stream.

20. The method of claim 19, wherein the computer infrastructure is at least one of maintained, deployed, supported and created by a service provider.

21. The method of claim 19, wherein the computer infrastructure is operable to analyze the downloaded media files for at least one of visual classification, piracy, speech to text conversion, object detection, facial detection and content duplication.

22. The method of claim 19, wherein the computer infrastructure is further operable to parse URLs from the XML stream and correlate descriptions provided in the XML stream with respective media files of the downloaded media files.

23. The method of claim 19, wherein the computer infrastructure is further operable to determine exception files.

24. A computer program product comprising a non-transitory computer readable storage medium having readable program instructions embodied in the storage medium, the program instructions are executable by a computing device to cause the computing device to:
   receive an XML stream that includes a series of URLs and related descriptions;
   parse the XML stream for each URL in the series of URLs;
   determine whether each of the URLs still exists;
   download and save content pertaining to each of the URLs;
   log the parsed URLs used to download the content;
   correlate the log of parsed URLs corresponding to the downloaded content with the received XML stream;
   create and store an updated XML which includes the correlated URLs; and
   provide the updated XML with a URL tag to identify the storage location of the updated XML.

25. The computer program product of claim 24, wherein the program instructions are further executable by the computing device to cause the computing device to correlate the downloaded content with the related description of the downloaded content and the URL of the downloaded content retrieved from the XML stream.

\* \* \* \* \*